(12) United States Patent
Nakamatsu et al.

(10) Patent No.: US 11,488,319 B2
(45) Date of Patent: Nov. 1, 2022

(54) THREE-DIMENSIONAL POSITION ESTIMATION DEVICE AND THREE-DIMENSIONAL POSITION ESTIMATION METHOD

(71) Applicant: Mitsubishi Electric Corporation, Tokyo (JP)

(72) Inventors: Yusuke Nakamatsu, Tokyo (JP); Asako Shigeta, Tokyo (JP); Shintaro Watanabe, Tokyo (JP); Ryosuke Torama, Tokyo (JP); Takashi Hirano, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 181 days.

(21) Appl. No.: 16/967,670

(22) PCT Filed: Feb. 26, 2018

(86) PCT No.: PCT/JP2018/006931
§ 371 (c)(1),
(2) Date: Aug. 5, 2020

(87) PCT Pub. No.: WO2019/163124
PCT Pub. Date: Aug. 29, 2019

(65) Prior Publication Data
US 2021/0217193 A1    Jul. 15, 2021

(51) Int. Cl.
*G06T 7/70* (2017.01)
*G06F 21/32* (2013.01)
(Continued)

(52) U.S. Cl.
CPC ............... *G06T 7/70* (2017.01); *G06F 21/32* (2013.01); *G06V 20/59* (2022.01); *G06V 40/172* (2022.01); *G06T 2207/30201* (2013.01); *G06T 2207/30268* (2013.01)

(58) Field of Classification Search
CPC ............ G06T 7/70; G06T 2207/30201; G06T 2207/30268; G06V 20/59; G06V 40/172; G06F 21/32
See application file for complete search history.

(56) References Cited

U.S. PATENT DOCUMENTS 5,572,595 A   11/1996   Kumagai et al.
10,088,899 B2 * 10/2018   Plummer ............... G06V 40/18
(Continued)

FOREIGN PATENT DOCUMENTS

JP   5-196425 A    8/1993
JP   2008-14825 A  1/2008
(Continued)

OTHER PUBLICATIONS

Japanese Office Action for Japanese Application No. 2020-501979, dated Jul. 6, 2021, with English translation.
(Continued)

*Primary Examiner* — Shaghayegh Azima
(74) *Attorney, Agent, or Firm* — Birch, Stewart, Kolasch & Birch, LLP

(57) ABSTRACT

A three-dimensional position estimation device includes: a feature point extracting unit for detecting an area corresponding to the face of an occupant in an image captured by a camera for imaging a vehicle interior and extracting a plurality of feature points in the detected area; an inter-feature-point distance calculating unit for calculating a first inter-feature-point distance that is a distance between distance-calculating feature points among the plurality of feature points; a face direction detecting unit for detecting the face direction of the occupant; a head position angle calculating unit for calculating a head position angle indicating the position of the head of the occupant with respect to an imaging axis of the camera; an inter-feature-point distance correcting unit for correcting the first inter-feature-point
(Continued)

distance to a second inter-feature-point distance that is a distance between distance-calculating feature points in a state where portions of the head corresponding to the distance-calculating feature points are arranged along a plane parallel to an imaging plane of the camera using a result detected by the face direction detecting unit and the head position angle; and a three-dimensional position estimating unit for estimating the three-dimensional position of the head using the head position angle, the second inter-feature-point distance, and a reference inter-feature-point distance.

10 Claims, 12 Drawing Sheets

(51) Int. Cl.
  *G06V 20/59* (2022.01)
  *G06V 40/16* (2022.01)

(56) References Cited

U.S. PATENT DOCUMENTS

| | | | |
|---|---|---|---|
| 10,777,082 B2* | 9/2020 | Ohta | G02B 27/01 |
| 2004/0062423 A1* | 4/2004 | Doi | G06V 40/16 |
| | | | 382/118 |
| 2009/0309702 A1* | 12/2009 | Hirai | G06V 40/168 |
| | | | 340/5.83 |
| 2013/0036017 A1* | 2/2013 | Galloway | G07F 7/0846 |
| | | | 705/16 |
| 2014/0160012 A1* | 6/2014 | Su | G06F 3/005 |
| | | | 345/156 |
| 2016/0239714 A1* | 8/2016 | Oami | G06V 20/59 |
| 2019/0147262 A1* | 5/2019 | Kuehnle | G07C 5/008 |
| | | | 340/439 |
| 2019/0276044 A1* | 9/2019 | Bae | B60W 30/18 |

FOREIGN PATENT DOCUMENTS

| | | |
|---|---|---|
| JP | 2009-287936 A | 12/2009 |
| WO | WO-2018006019 A1 * | 1/2018 ............ A61B 3/0025 |

OTHER PUBLICATIONS

Japanese Office Action for Japanese Application No. 2020-501979, dated Mar. 9, 2021, with English translation.
International Search Report issued in PCT/JP2018/006931 (PCT/ISA/210), dated Apr. 17, 2018.
Chinese Office Action and Search Report for Chinese Application No. 201880089120.X dated Jun. 25, 2021, with English translation.

\* cited by examiner

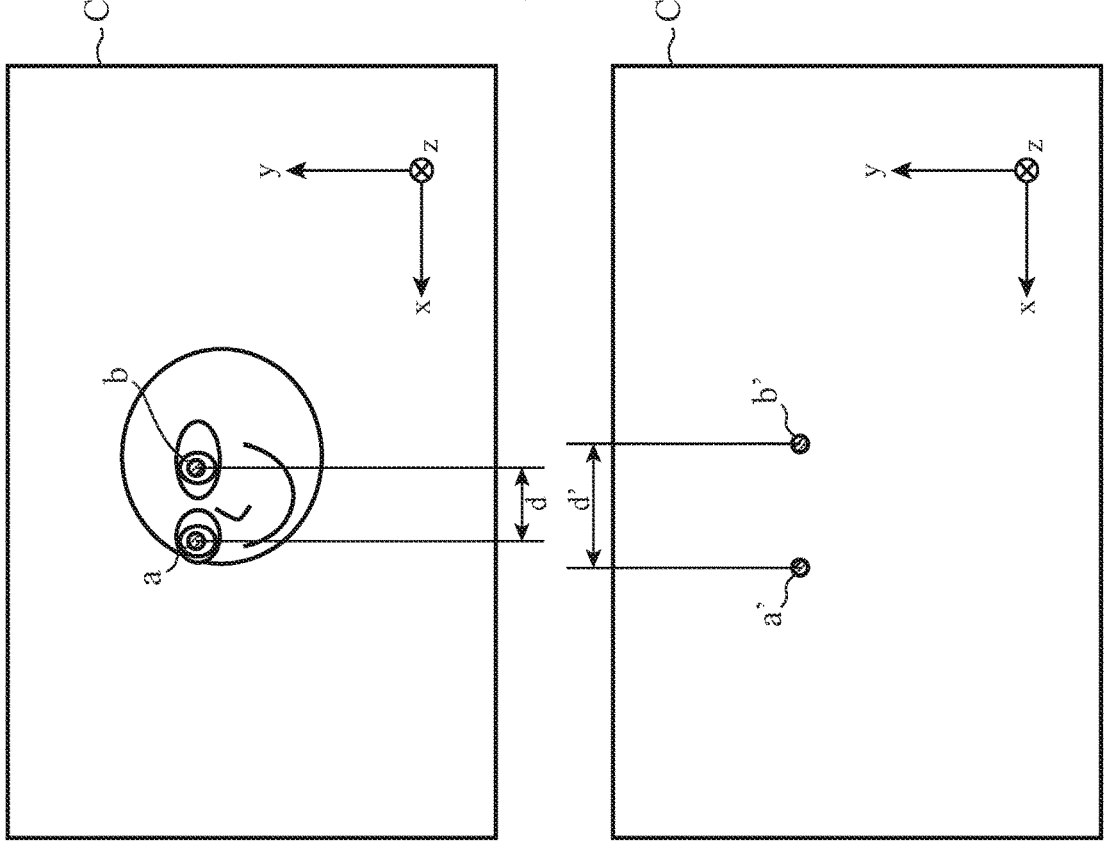

THREE-DIMENSIONAL POSITION ESTIMATION DEVICE AND THREE-DIMENSIONAL POSITION ESTIMATION METHOD

TECHNICAL FIELD

The present invention relates to a three-dimensional position estimation device and a three-dimensional position estimation method.

BACKGROUND ART

Conventionally, technology of extracting a feature point in an image in which an area including the head of a human is captured, calculating an inter-feature-point distance based on the extracted feature point, and estimating the three-dimensional position of the head using the calculated inter-feature-point distance has been developed. For example, Patent Literature 1 discloses a method for estimating the three-dimensional position of the head using a horizontal width of a hair part as an inter-feature-point distance.

CITATION LIST

Patent Literature

Patent Literature 1: JP 5-196425 A

SUMMARY OF INVENTION

Technical Problem

In recent years, in an in-vehicle system such as a so-called "driver monitoring system", it has been required to estimate the three-dimensional position of the head of an occupant with high accuracy.

Here, in the conventional technology of estimating the three-dimensional position of the head using an inter-feature-point distance, a calculated value of the inter-feature-point distance fluctuates by a change in a face direction of an occupant or by movement of the head of the occupant. Since a calculated value of the inter-feature-point distance fluctuates, the three-dimensional position cannot be accurately estimated disadvantageously.

The present invention has been achieved in order to solve the above problems, and an object of the present invention is to improve estimation accuracy of the three-dimensional position by reducing an influence of a change in the face direction, movement of the head, or the like.

Solution to Problem

A three-dimensional position estimation device according to the present invention includes: a feature point extracting unit for detecting an area corresponding to the face of an occupant in an image captured by a camera for imaging a vehicle interior and extracting a plurality of feature points in the detected area; an inter-feature-point distance calculating unit for calculating a first inter-feature-point distance that is a distance between distance-calculating feature points among the plurality of feature points; a face direction detecting unit for detecting a face direction of the occupant; a head position angle calculating unit for calculating a head position angle indicating the position of the head of the occupant with respect to an imaging axis of the camera; an inter-feature-point distance correcting unit for correcting the first inter-feature-point distance to a second inter-feature-point distance that is a distance between the distance-calculating feature points in a state where portions of the head corresponding to the distance-calculating feature points are arranged along a plane parallel to an imaging plane of the camera using a result detected by the face direction detecting unit and the head position angle; and a three-dimensional position estimating unit for estimating the three-dimensional position of the head using the head position angle, the second inter-feature-point distance, and a reference inter-feature-point distance.

Advantageous Effects of Invention

According to the present invention, since it is configured as described above, it can improve the estimation accuracy of the three-dimensional position by reducing an influence of a change in the face direction, movement of the head, or the like.

BRIEF DESCRIPTION OF DRAWINGS

FIG. 4A is an explanatory diagram illustrating an example of an inter-feature-point distance before correction by an inter-feature-point distance correcting unit. FIG. 4B is an explanatory diagram illustrating an image of correction by the inter-feature-point distance correcting unit. FIG. 4C is an explanatory diagram illustrating an example of an inter-feature-point distance after correction by the inter-feature-point distance correcting unit.

DESCRIPTION OF EMBODIMENTS

Hereinafter, in order to describe the present invention in more detail, embodiments for performing the present invention will be described referring to the attached drawings.

First Embodiment

Figure 1:
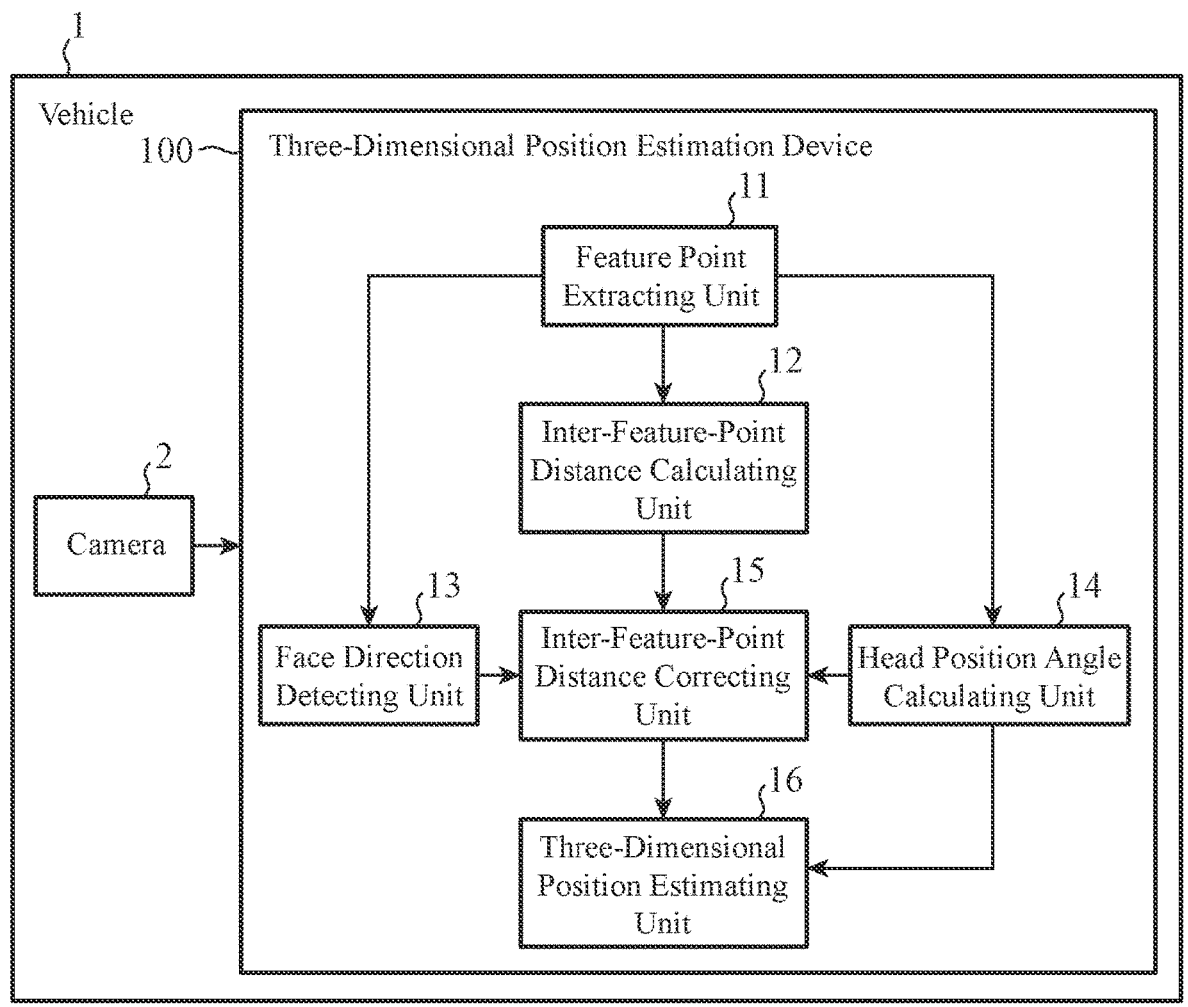
FIG. 1 is a block diagram illustrating a main part of a three-dimensional position estimation device according to a first embodiment of the present invention.
Figure 2:
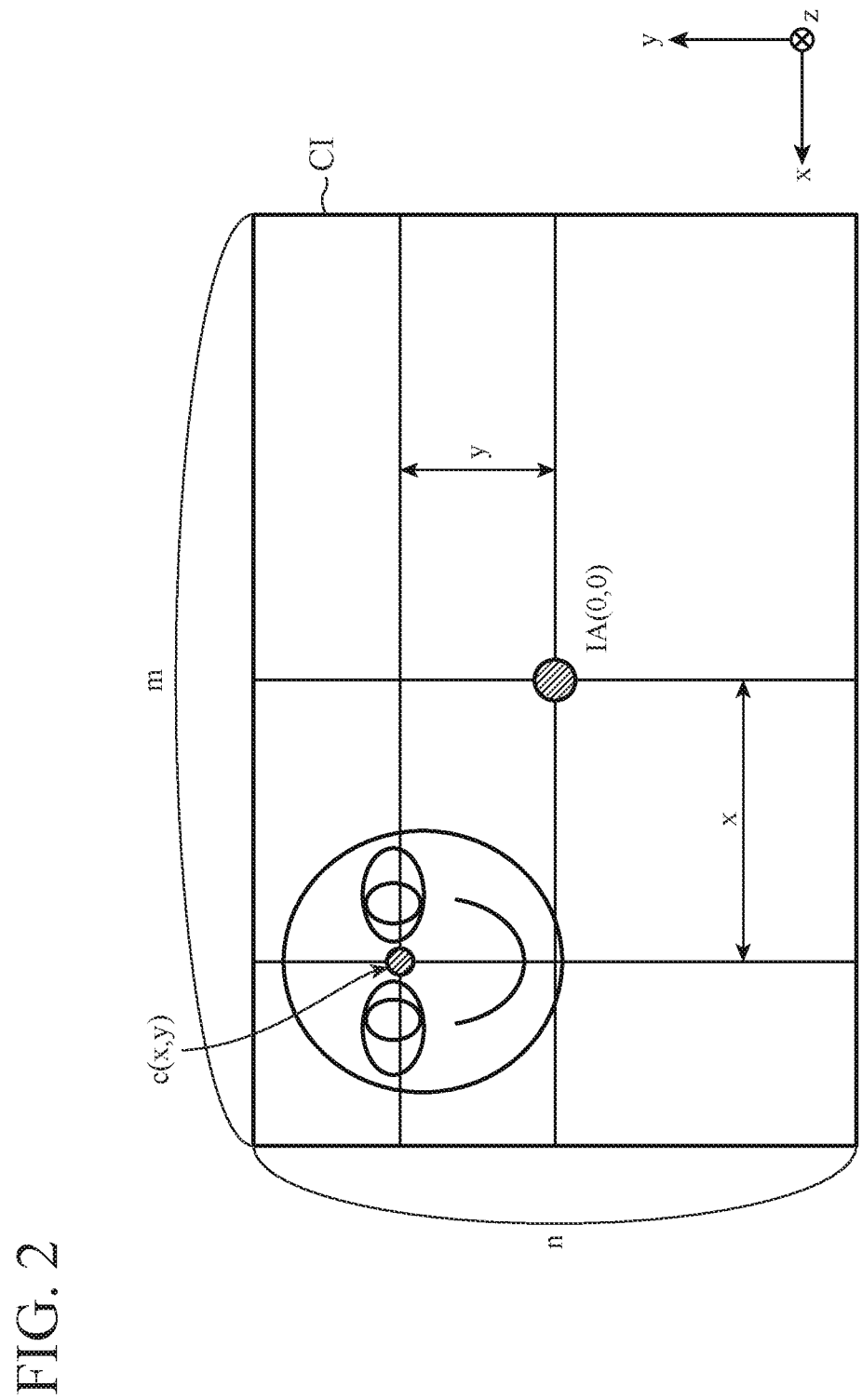
FIG. 2 is an explanatory diagram illustrating an example of the position coordinates of a target feature point in a captured image.
Figure 3A:
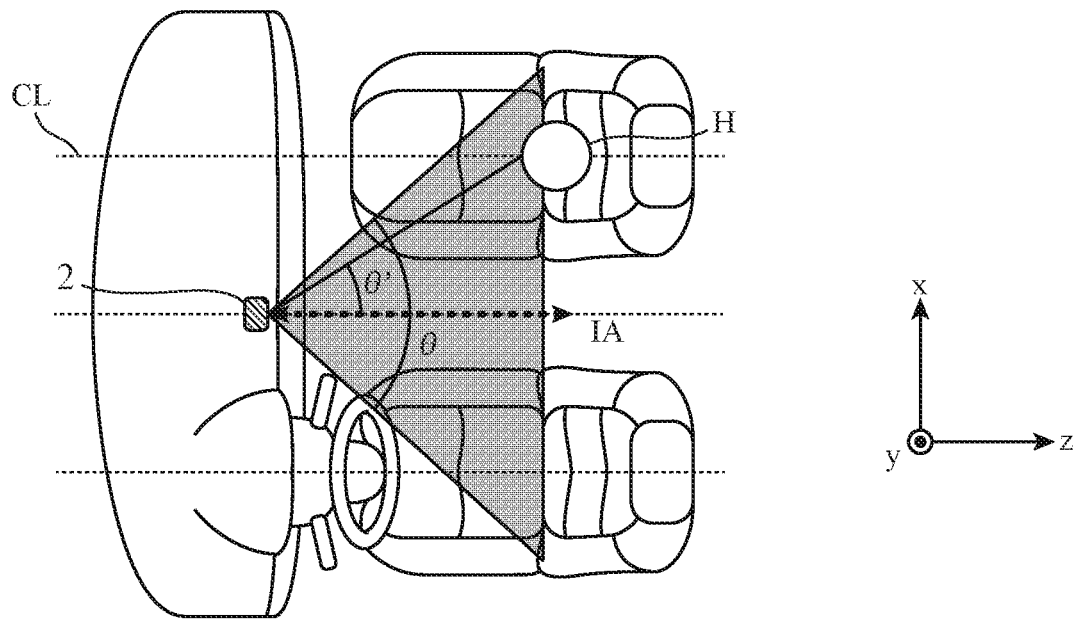
FIG. 3A is an explanatory diagram illustrating an example of an imaging angle of view and a head position angle with respect to the horizontal direction.
Figure 3B:
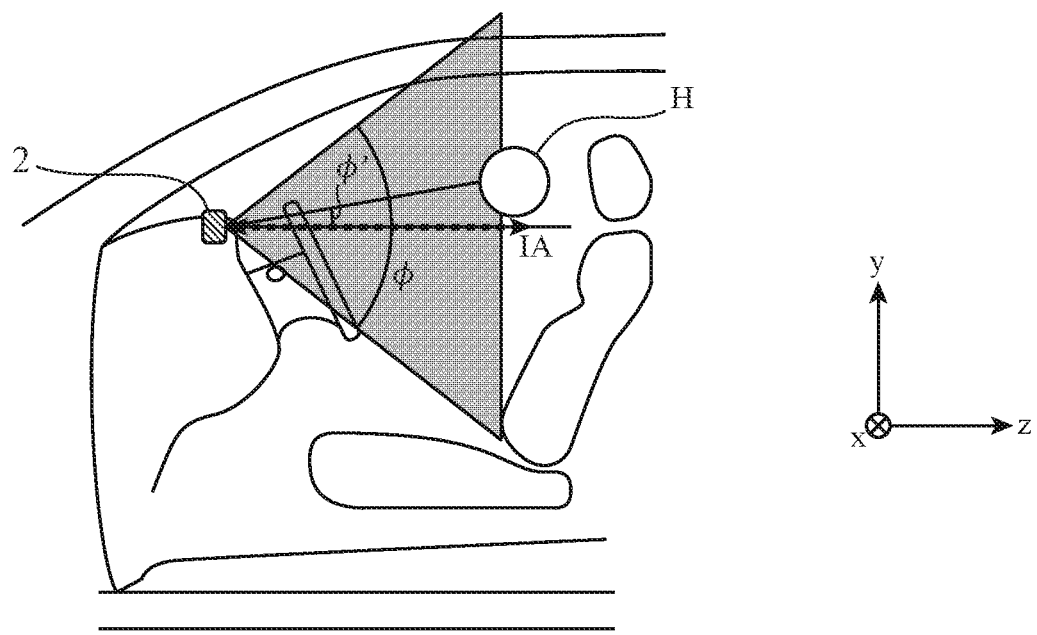
FIG. 3B is an explanatory diagram illustrating an example of an imaging angle of view and a head position angle with respect to the vertical direction.

FIG. 1 is a block diagram illustrating a main part of a three-dimensional position estimation device according to a first embodiment. FIG. 2 is an explanatory diagram illustrating an example of the position coordinates of a target feature point in a captured image. FIG. 3A is an explanatory diagram illustrating an example of an imaging angle of view and a head position angle with respect to the horizontal direction. FIG. 3B is an explanatory diagram illustrating an example of an imaging angle of view and a head position angle with respect to the vertical direction. FIG. 4A is an explanatory diagram illustrating an example of an inter-feature-point distance before correction by an inter-feature-point distance correcting unit. FIG. 4B is an explanatory diagram illustrating an image of correction by the inter-feature-point distance correcting unit. FIG. 4C is an explanatory diagram illustrating an example of an inter-feature-point distance after correction by the inter-feature-point distance correcting unit. A three-dimensional position estimation device 100 of the first embodiment will be described referring to FIGS. 1 to 4.

In the drawings, reference numeral 1 indicates a vehicle. The vehicle 1 includes a camera 2 for imaging a vehicle interior. The camera 2 is constituted by, for example, a visible light camera or an infrared camera attached to a dashboard of the vehicle 1. The camera 2 has imaging angles of view θ and φ capable of imaging a region including the face of an occupant seated on at least one of a driver's seat and a front passenger's seat of the vehicle 1 (hereinafter, referred to as "front seat").

Here, θ is an imaging angle of view with respect to the horizontal direction (direction along a virtual plane defined by the x-axis and the z-axis in the drawings), and φ is an imaging angle of view with respect to the vertical direction (direction along a virtual plane defined by the y-axis and the z-axis in the drawings). Note that the unit of the imaging angle of view is a degree (deg).

A feature point extracting unit 11 detects an area corresponding to the face of an occupant (hereinafter, referred to as a "face area") in an image CI captured by the camera 2. Specifically, for example, the feature point extracting unit 11 detects a face area with an algorithm such as AdaBoost or Cascade using a Haar-Like feature amount. Note that when a part of the face of an occupant is shielded by the hand or the like of the occupant in the captured image CI, the feature point extracting unit 11 may detect the face area by so-called "object tracking". For this object tracking, an algorithm such as particle filter or template matching can be used.

In addition, the feature point extracting unit 11 extracts a plurality of feature points in the face area. Specifically, for example, the feature point extracting unit 11 extracts a feature point corresponding to the right eye of an occupant, a feature point corresponding to the left eye of the occupant, a feature point corresponding to the center between both eyes of the occupant, a feature point corresponding to a tip of the nose of the occupant, and a feature point corresponding to the center of the mouth of the occupant.

An inter-feature-point distance calculating unit 12 calculates a distance between any two feature points (hereinafter, referred to as "distance-calculating feature points") among the plurality of feature points extracted by the feature point extracting unit 11 (hereinafter, referred to as "inter-feature-point distance"). Specifically, for example, the inter-feature-point distance calculating unit 12 calculates a distance between a feature point corresponding to the right eye of an occupant and a feature point corresponding to the left eye of the occupant. Alternatively, for example, the inter-feature-point distance calculating unit 12 calculates a distance between a feature point corresponding to the center between both eyes of an occupant and a feature point corresponding to the center of the mouth of the occupant. Note that the inter-feature-point distance is a distance in a captured image CI, and the unit of the inter-feature-point distance is a pixel.

The face direction detecting unit 13 detects a face direction of an occupant. Specifically, for example, the face direction detecting unit 13 acquires information indicating the position coordinates of each of the plurality of feature points extracted by the feature point extracting unit 11, and detects a face direction on the basis of a positional relationship among these feature points. Alternatively, for example, the face direction detecting unit 13 acquires image data indicating a captured image CI and detects a face direction on the basis of a result of machine learning with an algorithm such as Random Forest. In the latter case, the line connecting the feature point extracting unit 11 to the face direction detecting unit 13 in FIG. 1 is unnecessary.

The head position angle calculating unit 14 calculates angles θ' and φ' indicating the position of the head of an occupant with respect to an imaging axis IA of the camera 2 (hereinafter, referred to as "head position angles"). Here, θ' is a head position angle with respect to the horizontal direction, and φ' is a head position angle with respect to the vertical direction. Note that the unit of the head position angle is a degree (deg).

Specifically, for example, the head position angle calculating unit 14 stores values of imaging angles of view θ and φ, a value of resolution m in a first axis direction (x-axis direction in the drawings) in a captured image CI, and a value of resolution n in a second axis direction (y-axis direction in the drawings) in the captured image CI in advance. Note that the unit of the resolution is a pixel. The head position angle calculating unit 14 selects an arbitrary one feature point (hereinafter, referred to as "target feature point") among the plurality of feature points extracted by the feature point extracting unit 11, and acquires information indicating the position coordinates (x, y) of the target feature point in a captured image CI from the feature point extracting unit 11. The head position angle calculating unit 14 calculates the head position angles θ' and φ' using the following formulas (1) and (2).

$$x : \tan\theta' = (m/2) : \tan(\theta/2) \quad (1)$$

$$y : \tan\varphi' = (n/2) : \tan(\varphi/2) \quad (2)$$

More strictly, the head position angles θ' and φ' calculated using formulas (1) and (2) indicate the position of a portion corresponding to the target feature point in the head of an occupant (hereinafter, referred to as "target portion").

FIG. 2 illustrates an example of the position coordinates (x, y) of the target feature point when a feature point c corresponding to the center between both eyes of an occupant is selected as a target feature point. As illustrated in FIG. 2, the coordinates of a position corresponding to the imaging axis IA in a captured image CI, that is, the position coordinates of the center in the captured image CI are set to (0, 0).

FIG. 3 illustrates an example of the imaging angles of view θ and φ and the head position angles θ' and φ'. The symbol H in FIG. 3 indicates the head of an occupant. The symbol CL in FIG. 3 indicates a virtual straight line parallel to the front-back direction (z-axis direction in the drawing) of the vehicle 1 and passing through the center of a seat on which an occupant is seated in the left-right direction (x-axis direction in the drawing) of the vehicle 1 (hereinafter, referred to as "seat center line").

An inter-feature-point distance correcting unit 15 corrects the inter-feature-point distance calculated by the inter-feature-point distance calculating unit 12 using the result detected by the face direction detecting unit 13 and the head position angles θ' and φ' calculated by the head position angle calculating unit 14.

Here, a specific example of a correction method by the inter-feature-point distance correcting unit 15 will be described referring to FIG. 4. As illustrated in FIG. 4A, a distance d between distance-calculating feature points a and b is calculated by the inter-feature-point distance calculating unit 12. Meanwhile, the inter-feature-point distance correcting unit 15 calculates a face direction angle ψ of an occupant with respect to the imaging axis IA using the result detected by the face direction detecting unit 13 and the head position angles θ' and φ' (see FIG. 4B). The symbol IA' in FIG. 4B indicates a virtual axis parallel to the imaging axis IA and passing through the center between portions A and B corresponding to the distance-calculating feature points a and b in the head of an occupant.

Hereinafter, a virtual plane orthogonal to the imaging axis IA of the camera 2 and passing through a focal point of the camera 2 is referred to as "imaging plane". The symbol IS' in FIG. 4B indicates a virtual plane parallel to an imaging plane of the camera 2 and passing through the center between the portions A and B corresponding to the distance-calculating feature points a and b in the head of an occupant (hereinafter, referred to as "parallel plane"). By rotating a line segment between the portions A and B depending on the face direction angle ψ (A→A' and B→B' in the drawing), the inter-feature-point distance correcting unit 15 calculates a distance d' between feature points a' and b' corresponding to portions A' and B' in a state where the portions A and B are arranged along the parallel plane IS' (see FIG. 4C). The inter-feature-point distance correcting unit 15 uses the calculated distance d' as an inter-feature-point distance after correction.

A three-dimensional position estimating unit 16 estimates the three-dimensional position of the head of an occupant in the real space using the head position angles θ' and φ' calculated by the head position angle calculating unit 14, the inter-feature-point distance d' after correction by the inter-feature-point distance correcting unit 15, and a reference inter-feature-point distance D stored in the three-dimensional position estimating unit 16 in advance.

More specifically, the three-dimensional position estimating unit 16 calculates three-dimensional position coordinates (X, Y, Z) using the following formulas (3), (4), and (5) or (6). The three-dimensional position coordinates (X, Y, Z) indicate the three-dimensional position of a target portion in the real space, that is, the three-dimensional position of the head of an occupant in the real space.

$$X = x^* D/d' \quad (3)$$

$$Y = y^* D/d' \quad (4)$$

$$Z = X/\tan \theta' \quad (5)$$

$$Z = Y/\tan \varphi' \quad (6)$$

Here, the reference inter-feature-point distance D is a value as a reference for a width between portions corresponding to distance-calculating feature points in the real space, and the unit thereof is a millimeter (mm). Therefore, the unit of each of X, Y, and Z in the three-dimensional position coordinates (X, Y, Z) is also a millimeter (mm).

In the first embodiment, a value of the reference inter-feature-point distance D is set on the basis of statistical values of actually measured values for a plurality of persons. Specifically, for example, for each of a plurality of persons, a width between the portions A and B corresponding to the distance-calculating feature points a and b, that is, a width between both eyes is actually measured. The three-dimensional position estimating unit 16 stores an average value of the measured widths in advance as a value of the reference inter-feature-point distance D.

The feature point extracting unit 11, the inter-feature-point distance calculating unit 12, the face direction detecting unit 13, the head position angle calculating unit 14, the inter-feature-point distance correcting unit 15, and the three-dimensional position estimating unit 16 constitute a main part of the three-dimensional position estimation device 100.

Next, a hardware configuration of a main part of the three-dimensional position estimation device 100 will be described referring to FIG. 5.

Figure 5A:
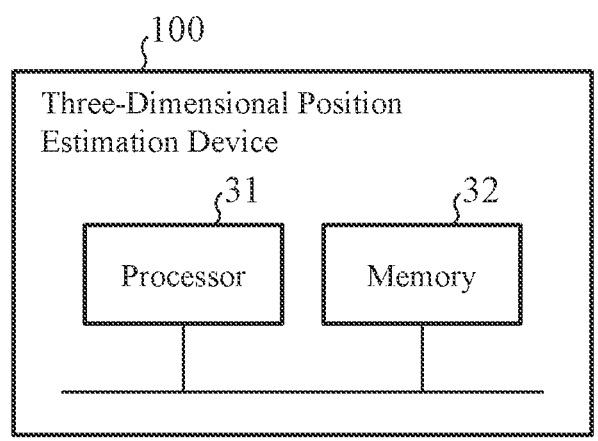
FIG. 5A is a block diagram illustrating a hardware configuration of the three-dimensional position estimation device according to the first embodiment of the present invention.

As illustrated in FIG. 5A, the three-dimensional position estimation device 100 is constituted by a computer, and includes a processor 31 and a memory 32. The memory 32 stores a program for causing the computer to function as the feature point extracting unit 11, the inter-feature-point distance calculating unit 12, the face direction detecting unit 13, the head position angle calculating unit 14, the inter-feature-point distance correcting unit 15, and the three-dimensional position estimating unit 16. The processor 31 reads out and executes the program stored in the memory 32, and functions of the feature point extracting unit 11, the inter-feature-point distance calculating unit 12, the face direction detecting unit 13, the head position angle calculating unit 14, the inter-feature-point distance correcting unit 15, and the three-dimensional position estimating unit 16 are thereby implemented.

The processor 31 uses, for example, a central processing unit (CPU), a graphics processing unit (GPU), a microprocessor, a microcontroller, or a digital signal processor (DSP). The memory 32 uses, for example, a semiconductor memory such as a random access memory (RAM), a read only memory (ROM), a flash memory, an erasable programmable read only memory (EPROM), or an electrically erasable programmable read-only memory (EEPROM), a magnetic disk, an optical disc, or a magneto-optical disk.

Figure 5B:
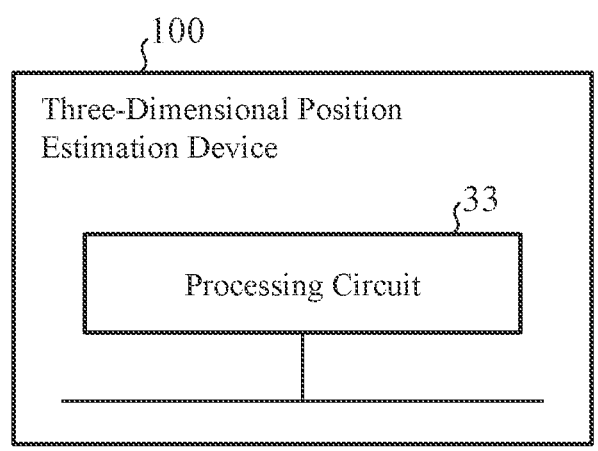
FIG. 5B is a block diagram illustrating another hardware configuration of the three-dimensional position estimation device according to the first embodiment of the present invention.

Alternatively, as illustrated in FIG. 5B, the functions of the feature point extracting unit 11, the inter-feature-point distance calculating unit 12, the face direction detecting unit 13, the head position angle calculating unit 14, the inter-feature-point distance correcting unit 15, and the three-dimensional position estimating unit 16 may be implemented by a processing circuit 33. The processing circuit 33 uses, for example, an application specific integrated circuit (ASIC), a programmable logic device (PLD), a field-programmable gate array (FPGA), a system-on-a-chip (SoC), or a system large-scale integration (LSI).

Figure 6:
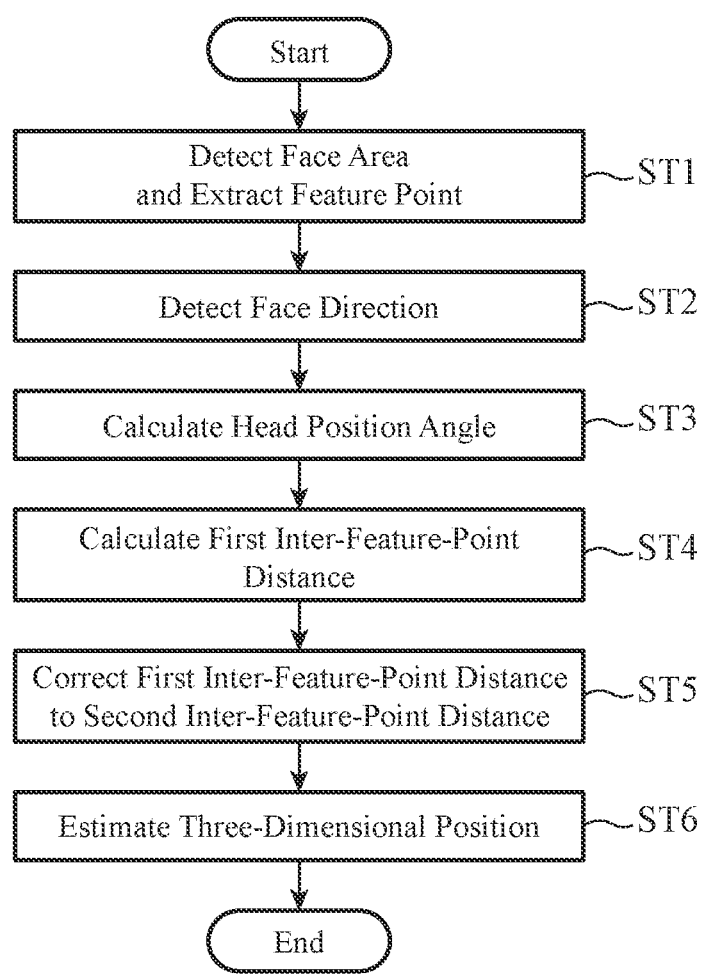
FIG. 6 is a flowchart illustrating the operation of the three-dimensional position estimation device according to the first embodiment of the present invention.

Next, the operation of the three-dimensional position estimation device 100 will be described referring to the flowchart of FIG. 6. Hereinafter, an inter-feature-point distance calculated by the inter-feature-point distance calculating unit 12, that is, an inter-feature-point distance before correction by the inter-feature-point distance correcting unit 15 is referred to as "first inter-feature-point distance." An inter-feature-point distance after correction by the inter-feature-point distance correcting unit 15 is referred to as "second inter-feature-point distance."

First, in step ST1, the feature point extracting unit 11 detects a face area in an image CI captured by the camera 2, and extracts a plurality of feature points in the face area.

Subsequently, in step ST2, the face direction detecting unit 13 detects a face direction of an occupant.

Subsequently, in step ST3, the head position angle calculating unit 14 calculates head position angles $\theta'$ and $\varphi'$.

Subsequently, in step ST4, the inter-feature-point distance calculating unit 12 calculates a distance between distance-calculating feature points among the plurality of feature points extracted by the feature point extracting unit 11, that is, the first inter-feature-point distance.

Subsequently, in step ST5, the inter-feature-point distance correcting unit 15 corrects the first inter-feature-point distance calculated by the inter-feature-point distance calculating unit 12 to the second inter-feature-point distance using the result detected by the face direction detecting unit 13 and the head position angles $\theta'$ and $\varphi'$ calculated by the head position angle calculating unit 14.

Subsequently, in step ST6, the three-dimensional position estimating unit 16 estimates the three-dimensional position of the head of the occupant in the real space using the head position angles $\theta'$ and $\varphi'$ calculated by the head position angle calculating unit 14, the inter-feature-point distance after correction by the inter-feature-point distance correcting unit 15 (that is, second inter-feature-point distance), and the reference inter-feature-point distance D stored therein in advance.

Even when the face of the occupant does not face the front or the head of the occupant is not on the seat center line CL, by correcting the inter-feature-point distance d using the result detected by the face direction detecting unit 13 and the head position angles $\theta'$ and $\varphi'$, and estimating the three-dimensional position using the head position angles $\theta'$ and $\varphi'$ and the inter-feature-point distance d' after correction, the three-dimensional position coordinates (X, Y, Z) calculated by the three-dimensional position estimating unit 16 can be close to the actual position of the head in the real space (more strictly, the actual position of a target portion). That is, an influence of a change in the face direction, movement of the head, or the like can be reduced, and estimation accuracy of the three-dimensional position can be improved.

Note that the camera 2 may be integrated with the three-dimensional position estimation device 100. In this case, the three-dimensional position estimation device 100 may include a lighting device for imaging by the camera 2.

Each of the feature point extracting unit 11, the inter-feature-point distance calculating unit 12, the face direction detecting unit 13, the head position angle calculating unit 14, the inter-feature-point distance correcting unit 15, and the three-dimensional position estimating unit 16 may be disposed in any one of an in-vehicle information device mounted on the vehicle 1, a portable information terminal that can be carried into the vehicle 1, and a server device that can communicate with the in-vehicle information device or the portable information terminal. That is, any two or more of the in-vehicle information device, the portable information terminal, and the server device may constitute a three-dimensional position estimating system.

The distance-calculating feature points may be any three or more feature points among the plurality of feature points extracted by the feature point extracting unit 11. In this case, the inter-feature-point distance may be a distance between each two of the three or more feature points.

As described above, the three-dimensional position estimation device 100 of the first embodiment includes: the feature point extracting unit 11 for detecting an area corresponding to the face of an occupant in an image CI captured by the camera 2 for imaging a vehicle interior and extracting a plurality of feature points in the detected area; the inter-feature-point distance calculating unit 12 for calculating the first inter-feature-point distance d that is a distance between distance-calculating feature points among the plurality of feature points; the face direction detecting unit 13 for detecting a face direction of the occupant; the head position angle calculating unit 14 for calculating the head position angles $\theta'$ and $\varphi'$ indicating the position of the head of the occupant with respect to the imaging axis IA of the camera 2; the inter-feature-point distance correcting unit 15 for correcting the first inter-feature-point distance d to the second inter-feature-point distance d' that is a distance between distance-calculating feature points in a state where portions of the head corresponding to the distance-calculating feature points are arranged along the plane IS' parallel to an imaging plane of the camera 2 using a result detected by the face direction detecting unit 13 and the head position angles $\theta'$ and $\varphi'$; and the three-dimensional position estimating unit 16 for estimating the three-dimensional position of the head using the head position angles $\theta'$ and $\varphi'$, the second inter-feature-point distance d', and the reference inter-feature-point distance D. As a result, an influence of a change in the face direction, movement of the head, or the like can be reduced, and the estimation accuracy of the three-dimensional position can be improved.

A three-dimensional position estimation method of the first embodiment includes: step ST1 in which the feature point extracting unit 11 detects an area corresponding to the face of an occupant in an image CI captured by the camera 2 for imaging a vehicle interior and extracts a plurality of feature points in the detected area; step ST4 in which the inter-feature-point distance calculating unit 12 calculates the first inter-feature-point distance d that is a distance between distance-calculating feature points among the plurality of feature points; step ST2 in which the face direction detecting unit 13 detects a face direction of the occupant; step ST3 in which the head position angle calculating unit 14 calculates the head position angles $\theta'$ and $\varphi'$ indicating the position of the head of the occupant with respect to the imaging axis IA of the camera 2; step ST5 in which the inter-feature-point distance correcting unit 15 corrects the first inter-feature-point distance d to the second inter-feature-point distance d' that is a distance between the distance-calculating feature points in a state where portions of the head corresponding to the distance-calculating feature points are arranged along the plane IS' parallel to an imaging plane IS of the camera 2 using a result detected by the face direction detecting unit 13 and the head position angles $\theta'$ and $\varphi'$; and step ST6 in which the three-dimensional position estimating unit 16 estimates the three-dimensional position of the head using the head position angles $\theta'$ and $\varphi'$, the second inter-feature-point distance d', and the reference inter-feature-point distance D. As a result, an influence of a change in the face direction, movement of the head, or the like can be reduced, and the estimation accuracy of the three-dimensional position can be improved.

Second Embodiment

Figure 7:
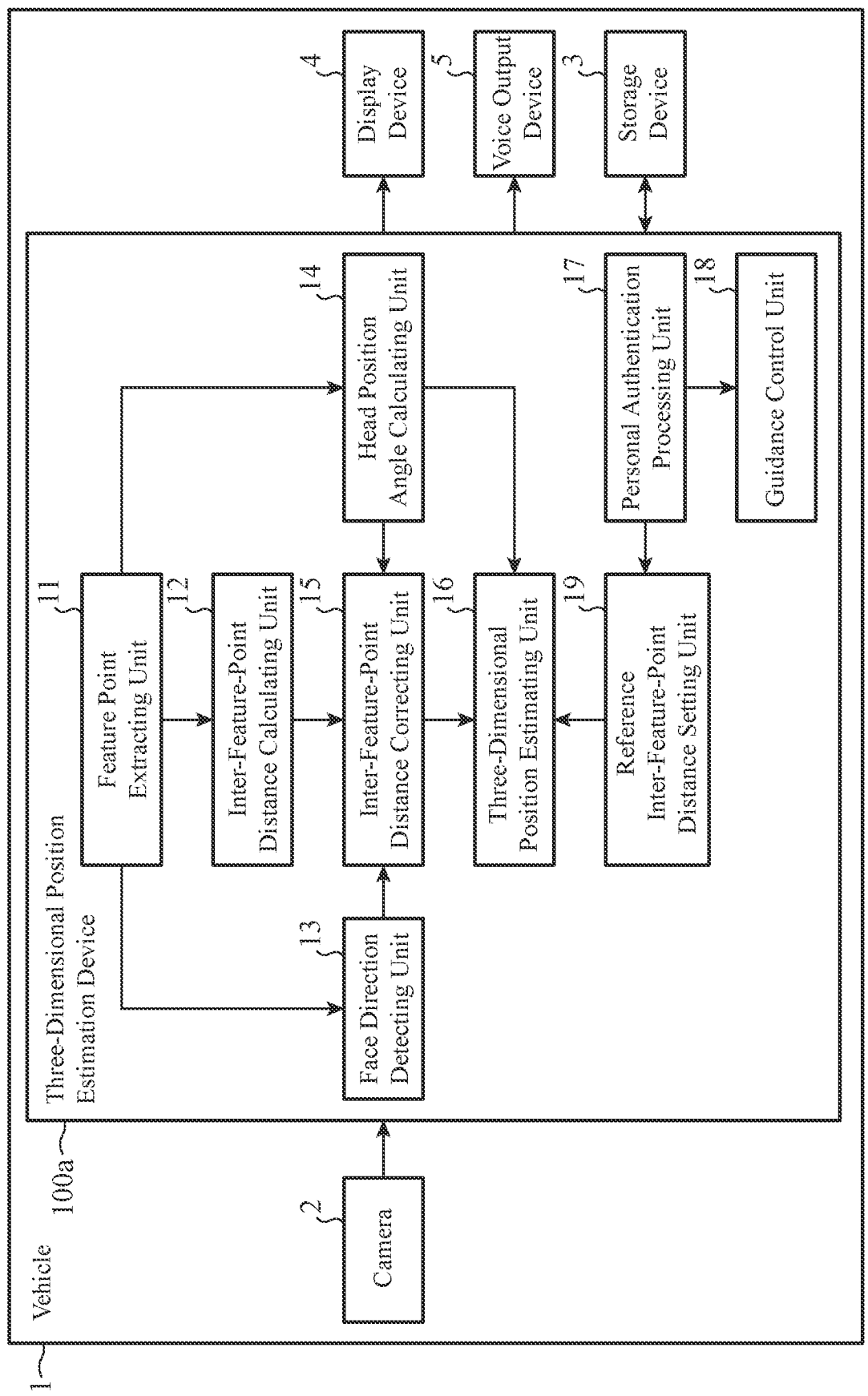
FIG. 7 is a block diagram illustrating a main part of a three-dimensional position estimation device according to a second embodiment of the present invention.
Figure 8:
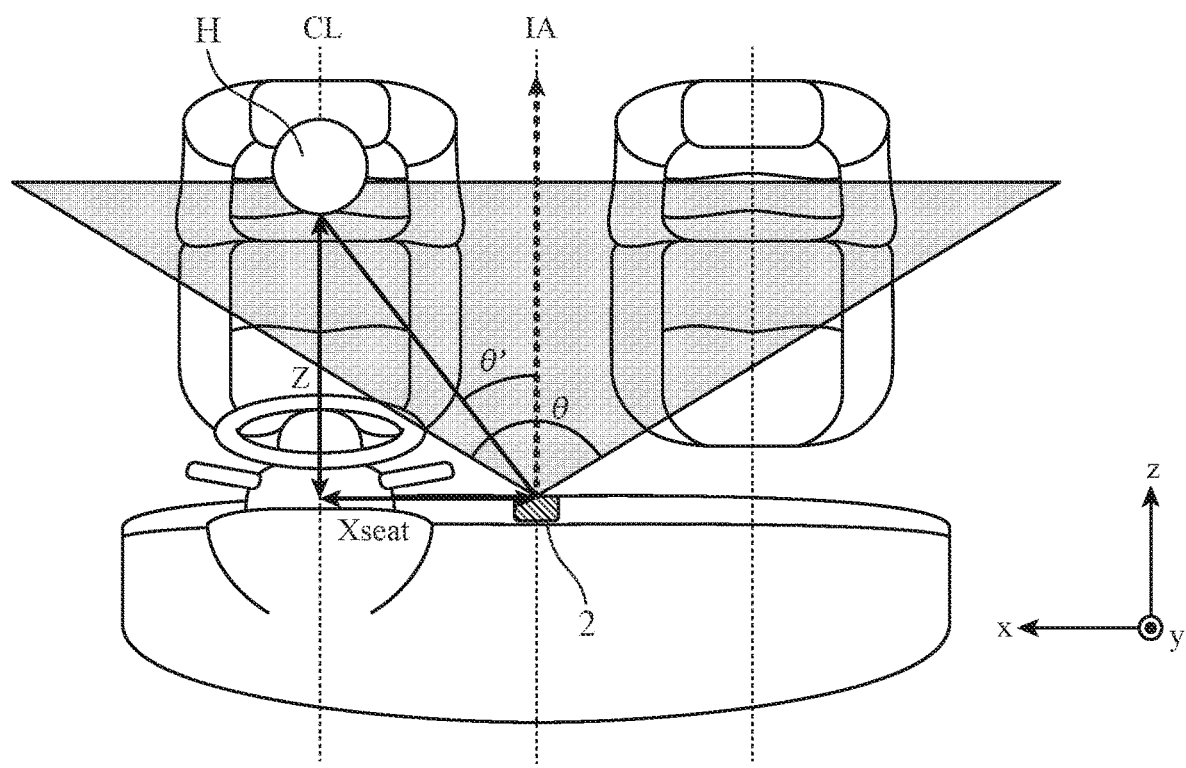
FIG. 8 is an explanatory diagram illustrating an example of a state where the head of a target occupant is at a reference position.
Figure 9:
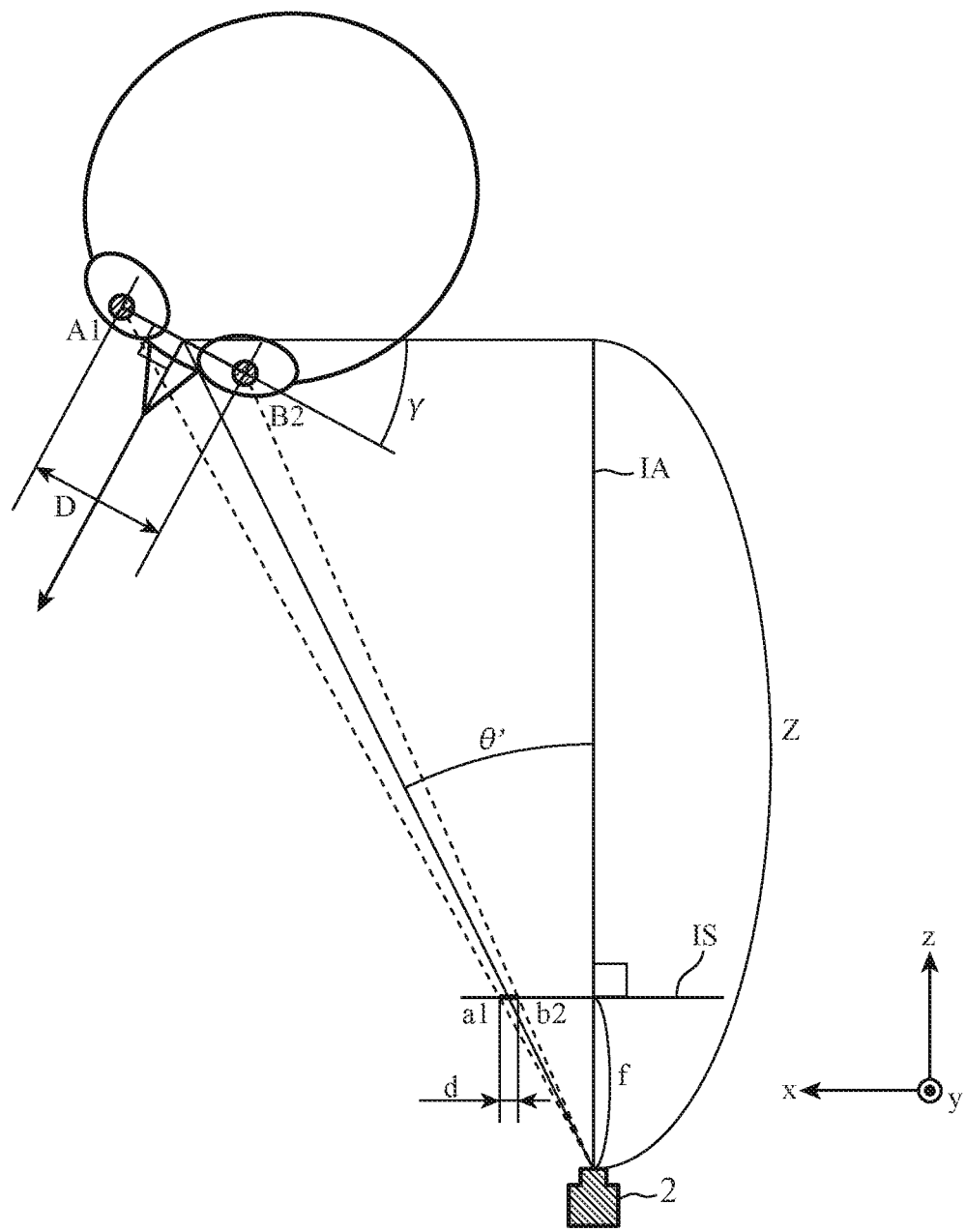
FIG. 9 is an explanatory diagram illustrating an example of a positional relationship among ones corresponding to values included in formulas (10) to (15).

FIG. 7 is a block diagram illustrating a main part of a three-dimensional position estimation device according to a second embodiment. FIG. 8 is an explanatory diagram illustrating an example of a state where the head of a target occupant is at a reference position. FIG. 9 is an explanatory diagram illustrating an example of a positional relationship among ones corresponding to values included in formulas (10) to (15). A three-dimensional position estimation device 100a of the second embodiment will be described referring to FIGS. 7 to 9. Note that in FIG. 7, the same reference numerals are given to blocks similar to those illustrated in FIG. 1, and description thereof will be omitted.

The three-dimensional position estimation device 100 of the first embodiment uses statistical values of actually measured values for a plurality of persons as the reference inter-feature-point distance D. Meanwhile, the three-dimensional position estimation device 100a of the second embodiment executes a personal authentication process for an occupant currently seated on a front seat of a vehicle 1 (hereinafter, referred to as "target occupant"), and sets a value of the reference inter-feature-point distance D for the target occupant depending on a result of the personal authentication process.

A personal authentication processing unit 17 executes a personal authentication process for the target occupant. Specifically, for example, the personal authentication processing unit 17 detects a face area in a captured image CI and extracts a feature amount for personal authentication in the face area. The personal authentication processing unit 17 determines whether or not the same personal authentication information as information indicating the extracted feature amount or the like (hereinafter, referred to as "personal authentication information") is stored in a storage device 3.

Hereinafter, an occupant whose personal authentication information and whose exclusive value of the reference inter-feature-point distance D are stored in the storage device 3 is referred to as "registered occupant". An occupant whose personal authentication information and whose exclusive value of the reference inter-feature-point distance D are not stored in the storage device 3 is referred to as "unregistered occupant". That is, the personal authentication process by the personal authentication processing unit 17 determines whether the target occupant is an unregistered occupant or a registered occupant.

When determining that the target occupant is an unregistered occupant, the personal authentication processing unit 17 causes the storage device 3 to store personal authentication information of the target occupant. The storage device 3 is constituted by, for example, an auxiliary storage device such as a hard disk drive (HDD) or a solid state drive (SSD).

When the personal authentication processing unit 17 executes a personal authentication process, a guidance control unit 18 executes control for guiding the head of the target occupant to a predetermined position (hereinafter, referred to as "reference position") (hereinafter, referred to as "guidance control"). The reference position is, for example, a position on a seat center line CL.

More specifically, the guidance control unit 18 causes a display device 4 to display an image for guiding the head of the target occupant to the reference position (hereinafter, referred to as "guidance image"), or causes a voice output device 5 to output voice for guiding the head of the target occupant to the reference position (hereinafter, referred to as "guidance voice"). The display device 4 is constituted by, for example, a liquid crystal display or an organic electro luminescence (EL) display integrated with the three-dimensional position estimation device 100a. The voice output device 5 is constituted by, for example, a speaker mounted on the vehicle 1. The target occupant moves his or her head to the reference position according to guidance by the guidance image or the guidance voice.

When the personal authentication processing unit 17 determines that the target occupant is an unregistered occupant, a reference inter-feature-point distance setting unit 19 calculates a value of the reference inter-feature-point distance D for the target occupant in a state after guidance by the guidance control unit 18. The reference inter-feature-point distance setting unit 19 sets the calculated value as a value of the reference inter-feature-point distance D in a three-dimensional position estimating unit 16. In addition, the reference inter-feature-point distance setting unit 19 causes the storage device 3 to store the calculated value in association with the personal authentication information of the target occupant. As a result, the target occupant who was an unregistered occupant becomes a registered occupant.

That is, when the personal authentication processing unit 17 determines that the target occupant is a registered occupant, a value of the reference inter-feature-point distance D for the target occupant is already stored in the storage device 3. In this case, the reference inter-feature-point distance setting unit 19 acquires the value of the reference inter-feature-point distance D for the target occupant stored in the storage device 3, and sets the acquired value as a value of the reference inter-feature-point distance D in the three-dimensional position estimating unit 16.

Here, a method for calculating the value of the reference inter-feature-point distance D for the target occupant will be described. The reference inter-feature-point distance setting unit 19 calculates the value of the reference inter-feature-point distance D for the target occupant using, for example, the following geometric formula.

The reference inter-feature-point distance setting unit 19 extracts a plurality of feature points by executing the same process as the feature point extracting unit 11 in a state after guidance by the guidance control unit 18, and calculates head position angles θ' and φ' by executing the same process as the head position angle calculating unit 14. A value of a width Xseat between an imaging axis IA and the seat center line CL is stored in the reference inter-feature-point distance setting unit 19 in advance. The reference inter-feature-point distance setting unit 19 calculates the three-dimensional position coordinates (X, Y, Z) of the head of the target occupant in a state after guidance using the following formulas (7) to (9).

$$X = X\text{seat} \tag{7}$$

$$Z = X\text{seat}/\tan \theta' \tag{8}$$

$$Y = Z * \tan \varphi' \tag{9}$$

FIG. 8 illustrates examples of Xseat, the head position angle θ' in a state after guidance, and Z of the three-dimensional position coordinates (X, Y, Z) of the head of the target occupant in the state after guidance. As illustrated in FIG. 8, Z can be calculated using formula (8).

The reference inter-feature-point distance setting unit 19 stores values of imaging angles of view θ and φ of a camera 2 and a value of a focal length f of the camera 2 in advance. The reference inter-feature-point distance setting unit 19 detects a face direction of the target occupant by executing the same process as the face direction detecting unit 13 in a state after guidance by the guidance control unit 18, and calculates a face direction angle γ of the target occupant with respect to an imaging plane IS. The reference inter-feature-point distance setting unit 19 calculates a distance d between any two feature points among the plurality of feature points extracted in a state after guidance by executing the same process as the inter-feature-point distance calculating unit 12.

Here, as illustrated in FIG. 9, the position of one of the two feature points on the imaging plane IS is referred to as a1, and the position of a portion corresponding to the feature point in the head of the target occupant (that is, right eye) in the real space is referred to as A1. The position of the other one of the two feature points on the imaging plane IS is referred to as b2, and the position of a portion corresponding to the feature point in the head of the target occupant (that is, left eye) in the real space is referred to as B2. The reference inter-feature-point distance setting unit 19 calculates a value of the reference inter-feature-point distance D for the target occupant using formula (15) based on the following formulas (10) to (14).

$$A1 = (Z\tan\theta' + D/2\cos\gamma, Z + D/2\sin\gamma) \quad (10)$$

$$B2 = (Z\tan\theta' - D/2\cos\gamma, Z - D/2\sin\gamma) \quad (11)$$

$$a1 = (Z\tan\theta' + D/2\cos\gamma)/(Z + D/2\sin\gamma) * f \quad (12)$$

$$b2 = (Z\tan\theta' - D/2\cos\gamma)/(Z - D/2\sin\gamma) * f \quad (13)$$

$$D = a1 - b2 = (Z\tan\theta' + D/2\cos\gamma)/(Z + D/2\sin\gamma)*f - \quad (14)$$
$$(Z\tan\theta' - D/2\cos\gamma)/(Z - D/2\sin\gamma)*f$$

$$d*D^{\wedge}2 + 4*f*Z*\sin\gamma(\tan\theta' - \tan\gamma)*D + 4*d*Z^{\wedge}2*(\sin\gamma)^{\wedge}2 = 0 \quad (15)$$

Note that the plurality of feature points in a state after guidance may be extracted by the feature point extracting unit 11 instead of the reference inter-feature-point distance setting unit 19. The head position angles θ' and φ' in a state after guidance may be calculated by the head position angle calculating unit 14 instead of the reference inter-feature-point distance setting unit 19. The face direction in a state after guidance may be detected by the face direction detecting unit 13 instead of the reference inter-feature-point distance setting unit 19. The distance d between two feature points in a state after guidance may be calculated by the inter-feature-point distance calculating unit 12 instead of the reference inter-feature-point distance setting unit 19. That is, these parameters may be shared by a process of calculating a value of the reference inter-feature-point distance D and a process of estimating the three-dimensional position of the head. In FIG. 7, a line connecting blocks to each other in these cases is not illustrated.

The feature point extracting unit 11, the inter-feature-point distance calculating unit 12, the face direction detecting unit 13, the head position angle calculating unit 14, the inter-feature-point distance correcting unit 15, the three-dimensional position estimating unit 16, the personal authentication processing unit 17, the guidance control unit 18, and the reference inter-feature-point distance setting unit 19 constitute a main part of the three-dimensional position estimation device 100a.

Since the hardware configuration of the main part of the three-dimensional position estimation device 100a is similar to that described referring to FIG. 5 in the first embodiment, detailed description thereof will be omitted. That is, a program for implementing the functions of the personal authentication processing unit 17, the guidance control unit 18, and the reference inter-feature-point distance setting unit 19 is stored in a memory 32. A processor 31 reads out and executes the program, and the functions of the personal authentication processing unit 17, the guidance control unit 18, and the reference inter-feature-point distance setting unit 19 are thereby implemented. Alternatively, the functions of the personal authentication processing unit 17, the guidance control unit 18, and the reference inter-feature-point distance setting unit 19 are implemented by a processing circuit 33.

Figure 10:
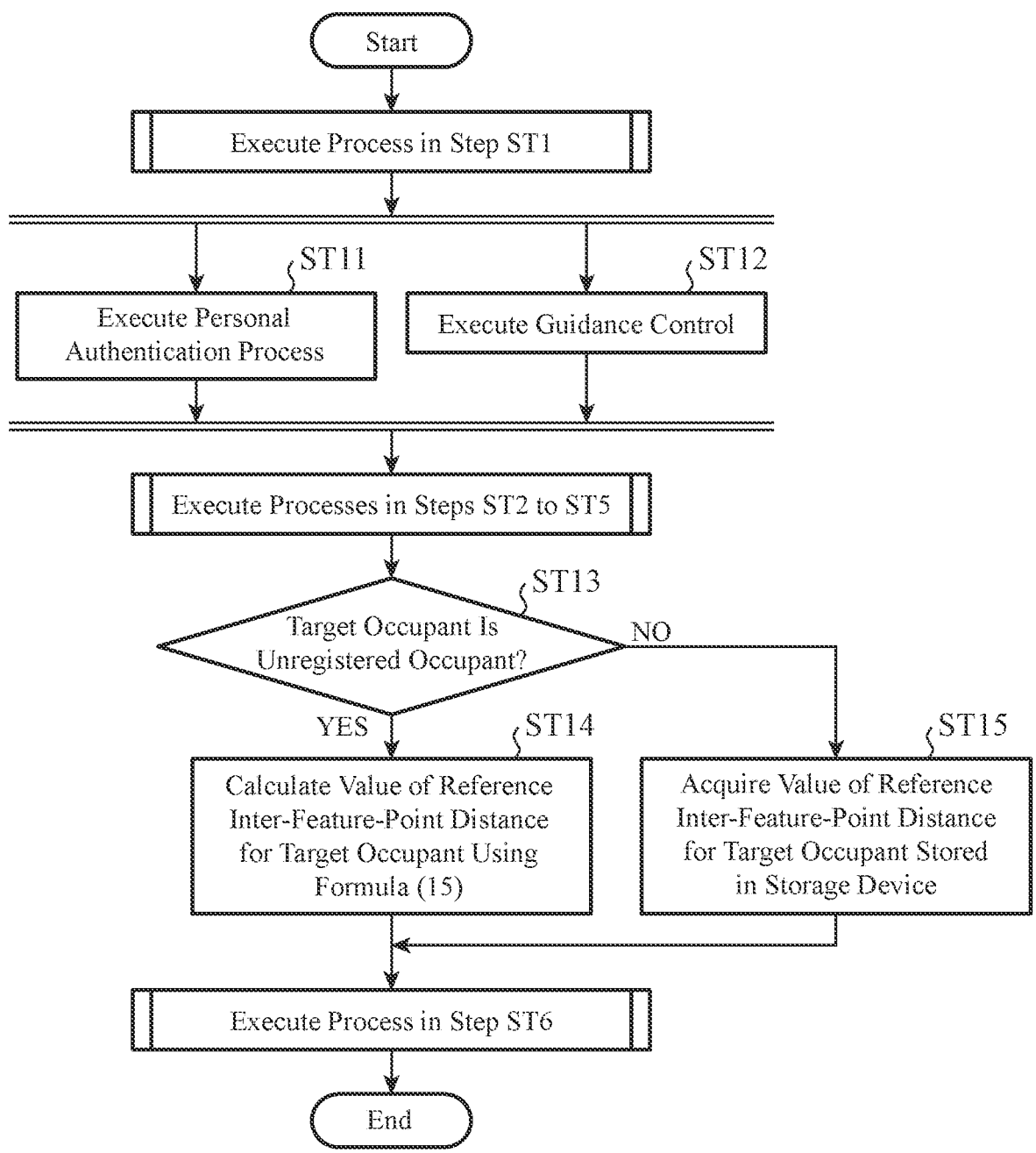
FIG. 10 is a flowchart illustrating an operation of the three-dimensional position estimation device according to the second embodiment of the present invention.

Next, the operation of the three-dimensional position estimation device 100a will be described referring to the flowchart of FIG. 10. Note that the contents of the processes in steps ST1 to ST6 are similar to those described referring to FIG. 6 in the first embodiment, and therefore description thereof will be omitted.

First, the feature point extracting unit 11 executes a process in step ST1.

Subsequently, in step ST11, the personal authentication processing unit 17 executes a personal authentication process for a target occupant. That is, the personal authentication processing unit 17 determines whether the target occupant is an unregistered occupant or a registered occupant, and outputs a determination result to the reference inter-feature-point distance setting unit 19. When determining that the target occupant is an unregistered occupant, the personal authentication processing unit 17 causes the storage device 3 to store personal authentication information of the target occupant.

When the personal authentication processing unit 17 executes a personal authentication process, in step ST12, the guidance control unit 18 executes guidance control. More specifically, the guidance control unit 18 causes the display device 4 to display a guidance image or causes the voice output device 5 to output guidance voice.

Subsequently, the face direction detecting unit 13 executes a process in step ST2. Subsequently, the head position angle calculating unit 14 executes a process in step ST3. Subsequently, the inter-feature-point distance calculating unit 12 executes a process in step ST4. Subsequently, the inter-feature-point distance correcting unit 15 executes a process in step ST5.

If the personal authentication processing unit 17 determines that the target occupant is an unregistered occupant ("YES" in step ST13), in step ST14, the reference inter-feature-point distance setting unit 19 calculates a value of the reference inter-feature-point distance D for the target occupant using formula (15). The reference inter-feature-point distance setting unit 19 sets the calculated value as a value of the reference inter-feature-point distance D in the three-dimensional position estimating unit 16. In addition, the reference inter-feature-point distance setting unit 19 causes the storage device 3 to store the calculated value in association with the personal authentication information of the target occupant.

Meanwhile, if the personal authentication processing unit 17 determines that the target occupant is a registered occupant ("NO" in step ST13), a value of the reference interfeature-point distance D for the target occupant is already stored in the storage device 3. Therefore, in step ST15, the reference inter-feature-point distance setting unit 19 acquires the value of the reference inter-feature-point distance D for the target occupant stored in the storage device 3, and sets the acquired value as a value of the reference inter-feature-point distance D in the three-dimensional position estimating unit 16.

Subsequently, the three-dimensional position estimating unit 16 executes a process in step ST6. At this time, the value set by the reference inter-feature-point distance setting unit 19 in step ST14 or ST15 is used as the reference inter-feature-point distance D.

Normally, a width between portions corresponding to distance-calculating feature points in the head (for example, a width between both eyes) varies depending on a person. Therefore, a value of the reference inter-feature-point distance D is also preferably set for each occupant from a viewpoint of further improving estimation accuracy of the three-dimensional position. That is, by executing a personal authentication process for the target occupant and setting a value of the reference inter-feature-point distance D for the target occupant depending on a result of the personal authentication process, an influence of an individual difference on a width between portions corresponding to distance-calculating feature points in the head can be reduced. As a result, the estimation accuracy of the three-dimensional position can be further improved.

Note that the reference inter-feature-point distance setting unit 19 may store a value of the reference inter-feature-point distance D similar to that of the first embodiment, that is, a value of the reference inter-feature-point distance D set on the basis of statistical values of actually measured values for a plurality of persons in advance. When the personal authentication process by the personal authentication processing unit 17 fails (that is, when it is not found whether the target occupant is an unregistered occupant or a registered occupant), the reference inter-feature-point distance setting unit 19 may set the value stored in advance as a value of the reference inter-feature-point distance D in the three-dimensional position estimating unit 16.

Depending on the contents or accuracy of the personal authentication process, guidance control at the time of executing the personal authentication process may be unnecessary. In such a case, the guidance control unit 18 only needs to execute guidance control prior to a process in step ST14, and the execution timing of the guidance control is not limited to the same timing as the execution timing of the personal authentication process. For example, in the flowchart illustrated in FIG. 10, the guidance control may be executed in a case of "YES" in step ST13, and subsequently the process in step ST14 may be executed. As a result, execution of guidance control is cancelled when the target occupant is a registered occupant. Therefore, the target occupant does not need to follow guidance, and a psychological load on the target occupant can be reduced.

In addition to control for guiding the head of the target occupant to the reference position, the guidance control may be control for guiding the face direction of the target occupant to a predetermined direction (for example, control for guiding the face of the occupant so as to face the front). That is, the reference inter-feature-point distance setting unit 19 may calculate a value of the reference inter-feature-point distance D for the target occupant in a state where the head of the target occupant is at the reference position and the face direction of the target occupant is in the predetermined direction.

When it is determined that the target occupant is an unregistered occupant, control for demanding an input of an actually measured value of a width between portions corresponding to distance-calculating feature points in the head of the target occupant may be executed instead of the guidance control. In this case, the reference inter-feature-point distance setting unit 19 may set an actually measured value input by an operation input device such as a touch panel or a hardware key as a value of the reference inter-feature-point distance D in the three-dimensional position estimating unit 16, and may cause the storage device 3 to store the input actually measured value in association with the personal authentication information of the target occupant.

As described above, the three-dimensional position estimation device 100*a* of the second embodiment includes the personal authentication processing unit 17 for executing a personal authentication process for a target occupant, and the reference inter-feature-point distance setting unit 19 for setting a value of the reference inter-feature-point distance D in the three-dimensional position estimating unit 16 depending on a result of the personal authentication process. As a result, an influence of an individual difference on a width between portions corresponding to distance-calculating feature points in the head can be reduced, and the estimation accuracy of the three-dimensional position can be further improved.

When a value of the reference inter-feature-point distance D for the target occupant is stored in the storage device 3, the reference inter-feature-point distance setting unit 19 sets the stored value as a value of the reference inter-feature-point distance D in the three-dimensional position estimating unit 16. As a result, execution of guidance control is cancelled when the target occupant is a registered occupant. Therefore, the target occupant does not need to follow guidance, and a psychological load on the target occupant can be reduced.

In addition, the three-dimensional position estimation device 100*a* includes the guidance control unit 18 for executing control for guiding the head to the reference position. When a value of the reference inter-feature-point distance D for the target occupant is not stored in the storage device 3, the reference inter-feature-point distance setting unit 19 calculates the value of the reference inter-feature-point distance D for the target occupant in a state after guidance by the guidance control unit 18, and sets the calculated value as a value of the reference inter-feature-point distance D in the three-dimensional position estimating unit 16. As a result, a value of the reference inter-feature-point distance D for the target occupant can be calculated in an appropriate state.

When the personal authentication processing unit 17 executes a personal authentication process, the guidance control unit 18 executes control for guiding the head to the reference position. As a result, guidance control can be executed prior to the process in step ST14. As a result, the process in step ST14 can be executed in a state where a probability that the head of the target occupant is at the reference position is high. Therefore, a value of the reference inter-feature-point distance D for the target occupant can be accurately calculated.

In addition, when calculating the value of the reference inter-feature-point distance D for the target occupant, the reference inter-feature-point distance setting unit 19 causes the storage device 3 to store the calculated value in association with the personal authentication information of the target occupant. As a result, the target occupant who was an unregistered occupant becomes a registered occupant. Therefore, subsequent calculation processes can be omitted.

Third Embodiment

Figure 11:
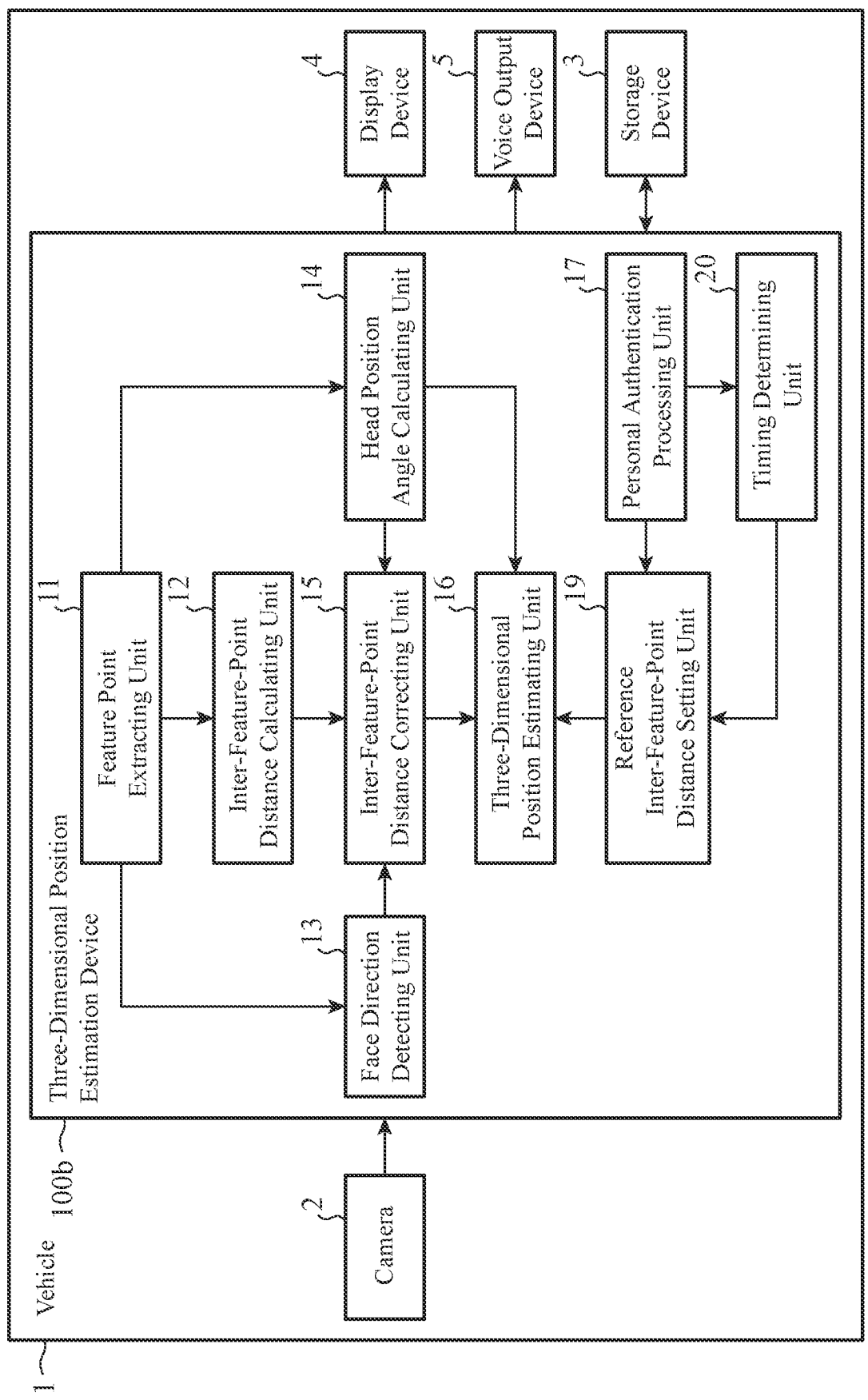
FIG. 11 is a block diagram illustrating a main part of a three-dimensional position estimation device according to a third embodiment of the present invention.

FIG. 11 is a block diagram illustrating a main part of a three-dimensional position estimation device according to a third embodiment. A three-dimensional position estimation device 100b of the third embodiment will be described referring to FIG. 11. Note that in FIG. 11, the same reference numerals are given to blocks similar to those illustrated in FIG. 7, and description thereof will be omitted.

The three-dimensional position estimation device 100a of the second embodiment guides the head of a target occupant to a reference position when the target occupant is an unregistered occupant, and calculates a value of the reference inter-feature-point distance D for the target occupant in a state after the guidance. Meanwhile, the three-dimensional position estimation device 100b of the third embodiment determines a timing at which a probability that the head of a target occupant is at the reference position is high when the target occupant is an unregistered occupant, and calculates a value of the reference inter-feature-point distance D for the target occupant at the determined timing.

A timing determining unit 20 determines a timing at which a probability that the head of a target occupant is at the reference position is higher than the probability at another timing when a personal authentication processing unit 17 determines that the target occupant is an unregistered occupant. A reference inter-feature-point distance setting unit 19 calculates a value of the reference inter-feature-point distance D for the target occupant at the timing determined by the timing determining unit 20 when the personal authentication processing unit 17 determines that the target occupant is an unregistered occupant.

That is, the timing determined by the timing determining unit 20 is a timing at which a value of the reference inter-feature-point distance D for the target occupant can be calculated. Hereinafter, the timing determined by the timing determining unit 20 is referred to as "calculable timing".

Here, a specific example of a method for determining the calculable timing by the timing determining unit 20 will be described. Note that the target occupant is a driver of a vehicle 1.

The timing determining unit 20 acquires information indicating a traveling speed of the vehicle 1 (hereinafter, referred to as "vehicle speed information") from an electronic control unit (ECU), a wheel speed sensor, or the like disposed in the vehicle 1. The timing determining unit 20 determines whether or not the traveling speed of the vehicle 1 is equal to or higher than a predetermined threshold using the vehicle speed information. That is, the timing determining unit 20 determines whether or not the vehicle 1 is traveling at high speed.

In addition, the timing determining unit 20 acquires information indicating a steering angle of the vehicle 1 (hereinafter, referred to as "steering angle information") from an ECU, a steering angle sensor, or the like disposed in the vehicle 1. The timing determining unit 20 determines whether or not the steering angle of the vehicle 1 is within a predetermined angle range including 0 degree (hereinafter, referred to as "first angle range") using the steering angle information. That is, the timing determining unit 20 determines whether or not a steering direction of the vehicle 1 is a straight traveling direction.

In addition, the timing determining unit 20 acquires image data indicating a captured image CI, and executes an image recognition process on the captured image CI. The timing determining unit 20 detects a straight line connecting both shoulders of an occupant to each other (hereinafter, referred to as "first straight line") by the image recognition process, and determines whether or not the first straight line is substantially horizontal. In addition, the timing determining unit 20 detects a straight line connecting the center of the head of an occupant to the center of the waist of the occupant (hereinafter, referred to as "second straight line") by the image recognition process, and determines whether or not an angle between the first straight line and the second straight line is within a predetermined angle range including 90 degrees (hereinafter, referred to as "second angle range").

When the traveling speed of the vehicle 1 is equal to or higher than the threshold, the steering angle of the vehicle 1 is within the first angle range, the first straight line is substantially horizontal, and the angle between the first straight line and the second straight line is within the second angle range, a probability that the head of a driver is on a seat center line CL of a driver's seat is high. Therefore, when these conditions are satisfied, the timing determining unit 20 determines that a calculable timing has come.

A feature point extracting unit 11, an inter-feature-point distance calculating unit 12, a face direction detecting unit 13, a head position angle calculating unit 14, an inter-feature-point distance correcting unit 15, a three-dimensional position estimating unit 16, the personal authentication processing unit 17, the reference inter-feature-point distance setting unit 19, and the timing determining unit 20 constitute a main part of the three-dimensional position estimation device 100b.

Since the hardware configuration of the main part of the three-dimensional position estimation device 100b is similar to that described referring to FIG. 5 in the first embodiment, detailed description thereof will be omitted. That is, a program for implementing the functions of the personal authentication processing unit 17, the reference inter-feature-point distance setting unit 19, and the timing determining unit 20 is stored in a memory 32. A processor 31 reads out and executes the program, and the functions of the personal authentication processing unit 17, the reference inter-feature-point distance setting unit 19, and the timing determining unit 20 are thereby implemented. Alternatively, the functions of the personal authentication processing unit 17, the reference inter-feature-point distance setting unit 19, and the timing determining unit 20 are implemented by a processing circuit 33.

Figure 12:
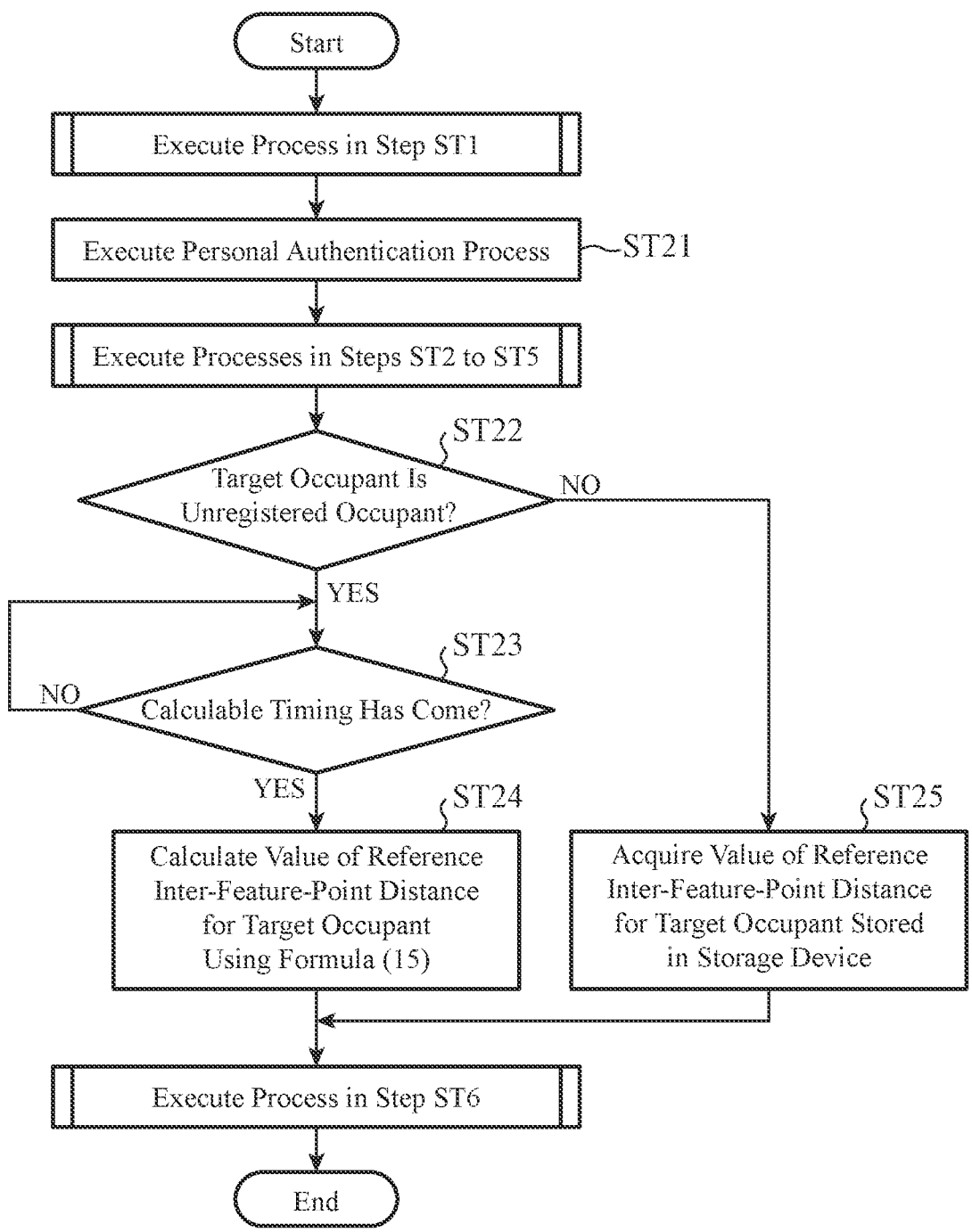
FIG. 12 is a flowchart illustrating an operation of the three-dimensional position estimation device according to the third embodiment of the present invention.

Next, the operation of the three-dimensional position estimation device 100b will be described referring to the flowchart of FIG. 12. Note that the contents of the processes in steps ST1 to ST6 are similar to those described referring to FIG. 6 in the first embodiment, and therefore description thereof will be omitted.

First, the feature point extracting unit 11 executes a process in step ST1.

Subsequently, in step ST21, the personal authentication processing unit 17 executes personal authentication process for a target occupant. That is, the personal authentication processing unit 17 determines whether the target occupant is an unregistered occupant or a registered occupant, and outputs a determination result to the reference inter-feature-point distance setting unit 19 and the timing determining unit 20. When determining that the target occupant is an unregistered occupant, the personal authentication processing unit 17 causes the storage device 3 to store personal authentication information of the target occupant.

Subsequently, the face direction detecting unit 13 executes a process in step ST2. Subsequently, the head position angle calculating unit 14 executes a process in step ST3. Subsequently, the inter-feature-point distance calculating unit 12 executes a process in step ST4. Subsequently, the inter-feature-point distance correcting unit 15 executes a process in step ST5.

If the personal authentication processing unit 17 determines that the target occupant is an unregistered occupant ("YES" in step ST22), in step ST23, the timing determining unit 20 determines whether or not a calculable timing has come. If a calculable timing has come ("YES" in step ST23), in step ST24, the reference inter-feature-point distance setting unit 19 calculates a value of the reference inter-feature-point distance D for the target occupant using formula (15). The reference inter-feature-point distance setting unit 19 sets the calculated value as a value of the reference inter-feature-point distance D in the three-dimensional position estimating unit 16. In addition, the reference inter-feature-point distance setting unit 19 causes the storage device 3 to store the calculated value in association with the personal authentication information of the target occupant.

Meanwhile, if the personal authentication processing unit 17 determines that the target occupant is a registered occupant ("NO" in step ST22), a value of the reference inter-feature-point distance D for the target occupant is already stored in the storage device 3. Therefore, in step ST25, the reference inter-feature-point distance setting unit 19 acquires the value of the reference inter-feature-point distance D for the target occupant stored in the storage device 3, and sets the acquired value as a value of the reference inter-feature-point distance D in the three-dimensional position estimating unit 16.

Subsequently, the three-dimensional position estimating unit 16 executes a process in step ST6. At this time, the value set by the reference inter-feature-point distance setting unit 19 in step ST24 or ST25 is used as the reference inter-feature-point distance D.

As described above, by determination of a calculable timing by the timing determining unit 20, guidance control can be omitted. As a result, the target occupant does not need to move his or her head to the reference position according to guidance control, and a psychological load on the target occupant can be reduced.

Note that the reference inter-feature-point distance setting unit 19 may store a value of the reference inter-feature-point distance D similar to that of the first embodiment, that is, a value of the reference inter-feature-point distance D set on the basis of statistical values of actually measured values for a plurality of persons in advance. When the personal authentication process by the personal authentication processing unit 17 fails (that is, when it is not found whether the target occupant is an unregistered occupant or a registered occupant), the reference inter-feature-point distance setting unit 19 may set the value stored in advance as a value of the reference inter-feature-point distance D in the three-dimensional position estimating unit 16. When a predetermined time has elapsed without determination that a calculable timing has come after the timing determining unit 20 starts a process in step ST23, the reference inter-feature-point distance setting unit 19 may set the value stored in advance as a value of the reference inter-feature-point distance D in the three-dimensional position estimating unit 16.

The timing determining unit 20 only needs to determine at least one condition of whether or not the traveling speed of the vehicle 1 is equal to or higher than the threshold, whether or not the steering angle of the vehicle 1 is within the first angle range, whether or not the first straight line is substantially horizontal, and whether or not the angle between the first straight line and the second straight line is within the second angle range. By reducing the conditions to be determined, a processing load on the processor 31 or the processing circuit 33 can be reduced. Meanwhile, by increasing the conditions to be determined, the accuracy of determining a calculable timing can be improved. That is, a timing at which a probability that the head of the target occupant is at the reference position is higher can be determined.

The timing determining unit 20 may determine a timing at which a probability that the head of the target occupant is at the reference position is higher than the probability at another timing, and a probability that the face direction of the target occupant is a predetermined direction (for example, the face of the target occupant faces the front) is higher than the probability at another timing.

As described above, the three-dimensional position estimation device 100b of the third embodiment includes the timing determining unit 20 for determining a timing at which a probability that the head is at the reference position is higher than the probability at another timing. When a value of the reference inter-feature-point distance D for the target occupant is not stored in the storage device 3, the reference inter-feature-point distance setting unit 19 calculates the value of the reference inter-feature-point distance D for the target occupant at a timing determined by the timing determining unit 20, and sets the calculated value as a value of the reference inter-feature-point distance D in the three-dimensional position estimating unit 16. As a result, a value of the reference inter-feature-point distance D for the target occupant can be calculated at an appropriate timing. In addition, guidance control can be omitted, and a psychological load on the target occupant can be reduced.

In addition, the timing determining unit 20 determines a timing at which a probability that the head of the target occupant is at the reference position is higher than the probability at another timing using information indicating the traveling speed of the vehicle 1 on which the target occupant is boarding and information indicating the steering angle of the vehicle 1. In a case where the target occupant is a driver of the vehicle 1, when the vehicle 1 is traveling at high speed, and the steering direction of the vehicle 1 is a straight traveling direction, a probability that the head of the driver is on the seat center line CL of the driver's seat is high. Using this, a calculable timing can be determined.

Note that the present invention can freely combine the embodiments to each other, modify any constituent element in each of the embodiments, or omit any constituent element in each of the embodiments within the scope of the invention.

INDUSTRIAL APPLICABILITY

The three-dimensional position estimation device of the present invention can be applied to, for example, an in-vehicle system such as a driver monitoring system.

REFERENCE SIGNS LIST

1: vehicle,
2: camera,
3: storage device,
4: display device,
5: voice output device,
11: feature point extracting unit,
12: inter-feature-point distance calculating unit,
13: face direction detecting unit,
14: head position angle calculating unit,
15: inter-feature-point distance correcting unit, 16: three-dimensional position estimating unit,
17: personal authentication processing unit,
18: guidance control unit,
19: reference inter-feature-point distance setting unit,
20: timing determining unit,
31: processor,
32: memory,
33: processing circuit,
100, 100a, and 100b: three-dimensional position estimation device

The invention claimed is:

1. A three-dimensional position estimation device comprising:
processing circuitry
to detect an area corresponding to a face of an occupant in a first image captured by a camera for imaging a vehicle interior and to extract a plurality of feature points in the detected area;
to calculate a first inter-feature-point distance that is a distance between distance-calculating feature points among the plurality of feature points;
to detect a face direction of the occupant;
to calculate a head position angle indicating a position of a head of the occupant with respect to an imaging axis of the camera;
to correct the first inter-feature-point distance to a second inter-feature-point distance that is a distance between the distance-calculating feature points in a state where portions of the head corresponding to the distance-calculating feature points are arranged along a plane parallel to an imaging plane of the camera using a result detected and the head position angle;
to estimate a three-dimensional position of the head using the head position angle, the second inter-feature-point distance, and a reference inter-feature-point distance; and
to execute a personal authentication process for the occupant,
wherein the processing circuitry determines, on a basis of a result of the personal authentication process, whether a value of the reference inter-feature-point distance for the occupant is stored in a storage device,
when the value of the reference inter-feature-point distance for the occupant is not stored in a storage device, the processing circuitry determines, on a basis of a traveling speed of a vehicle on which the occupant is boarding and information indicating a steering angle of the vehicle, a timing at which an image for the reference inter-feature-point distance is captured, and calculates, from the image captured at the determined timing, the value of the reference inter-feature-point distance for the occupant.

2. The three-dimensional position estimation device according to claim 1, wherein when a value of the reference inter-feature-point distance for the occupant is stored in the storage device, the processing circuitry sets the stored value as a value of the reference inter-feature-point distance.

3. The three-dimensional position estimation device according to claim 1, the processing circuitry executes control for guiding the head to a reference position, wherein when a value of the reference inter-feature-point distance for the occupant is not stored in the storage device, the processing circuitry calculates the value of the reference inter-feature-point distance for the occupant in a state after guidance, and sets the calculated value as a value of the reference inter-feature-point distance.

4. A three-dimensional position estimation device comprising:
processing circuitry
to detect an area corresponding to a face of an occupant in an image captured by a camera for imaging a vehicle interior and to extract a plurality of feature points in the detected area;
to calculate a first inter-feature-point distance that is a distance between distance-calculating feature points among the plurality of feature points;
to detect a face direction of the occupant;
to calculate a head position angle indicating a position of a head of the occupant with respect to an imaging axis of the camera;
to correct the first inter-feature-point distance to a second inter-feature-point distance that is a distance between the distance-calculating feature points in a state where portions of the head corresponding to the distance-calculating feature points are arranged along a plane parallel to an imaging plane of the camera using a result detected and the head position angle; and
to estimate a three-dimensional position of the head using the head position angle, the second inter-feature-point distance, and a reference inter-feature-point distance,
wherein the processing circuitry determines a timing at which a probability that the head is at a reference position is higher than the probability at another timing, and wherein
the processing circuitry calculates the value of the reference inter-feature-point distance for the occupant at a timing determined, and sets the calculated value as a value of the reference inter-feature-point distance.

5. The three-dimensional position estimation device according to claim 4, wherein the processing circuitry determines a timing at which a probability that the head is at the reference position is higher than the probability at another timing using information indicating a traveling speed of a vehicle on which the occupant is boarding and information indicating a steering angle of the vehicle.

6. The three-dimensional position estimation device according to claim 3, wherein when calculating the value of the reference inter-feature-point distance for the occupant, the processing circuitry causes the storage device to store the calculated value in association with personal authentication information of the occupant.

7. A three-dimensional position estimation method comprising:
detecting an area corresponding to a face of an occupant in a first image captured by a camera for imaging a vehicle interior and extracting a plurality of feature points in the detected area;
calculating a first inter-feature-point distance that is a distance between distance-calculating feature points among the plurality of feature points;
detecting a face direction of the occupant;
calculating a head position angle indicating a position of a head of the occupant with respect to an imaging axis of the camera;
correcting the first inter-feature-point distance to a second inter-feature-point distance that is a distance between the distance-calculating feature points in a state where portions of the head corresponding to the distance-calculating feature points are arranged along a plane parallel to an imaging plane of the camera using a result detected and the head position angle;

estimating a three-dimensional position of the head using the head position angle, the second inter-feature-point distance, and a reference inter-feature-point distance;

executing a personal authentication process for the occupant;

determining, on a basis of a result of the personal authentication process, whether a value of the reference inter-feature-point distance for the occupant is stored in a storage device; and when the value of the reference inter-feature-point distance for the occupant is not stored in a storage device, determining, on a basis of a traveling speed of a vehicle on which the occupant is boarding and information indicating a steering angle of the vehicle, a timing at which an image for the reference inter-feature-point distance is captured, and calculating, from the image captured at the determined timing, the value of the reference inter-feature-point distance for the occupant.

8. The three-dimensional position estimation device according to claim 3, wherein when calculating the value of the reference inter-feature-point distance for the occupant, the processing circuitry causes the storage device to store the calculated value in association with the occupant.

9. The three-dimensional position estimation device according to claim 4, wherein when calculating the value of the reference inter-feature-point distance for the occupant, the processing circuitry causes the storage device to store the calculated value in association with personal authentication information of the occupant.

10. The three-dimensional position estimation device according to claim 5, wherein when calculating the value of the reference inter-feature-point distance for the occupant, the processing circuitry causes the storage device to store the calculated value in association with personal authentication information of the occupant.

* * * * *